UNITED STATES PATENT OFFICE.

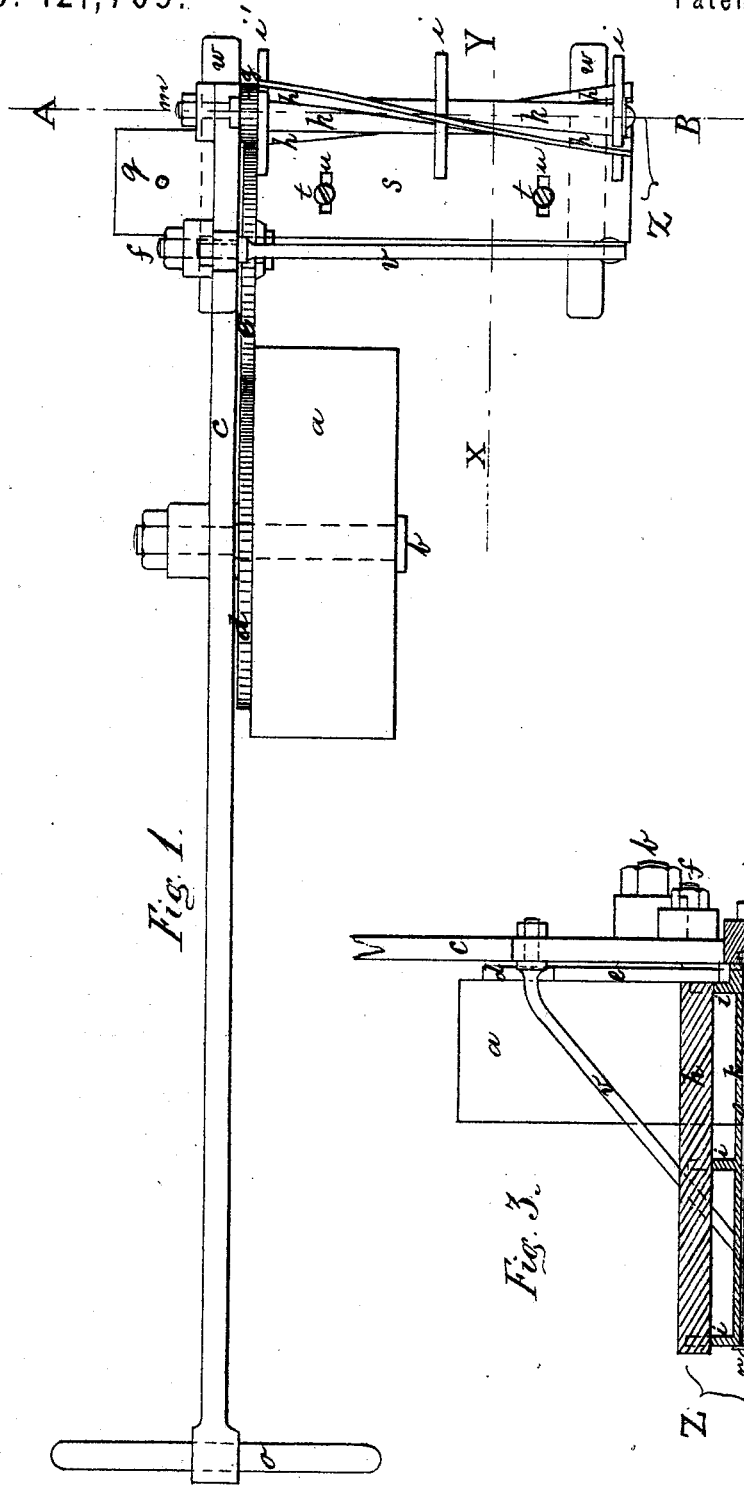

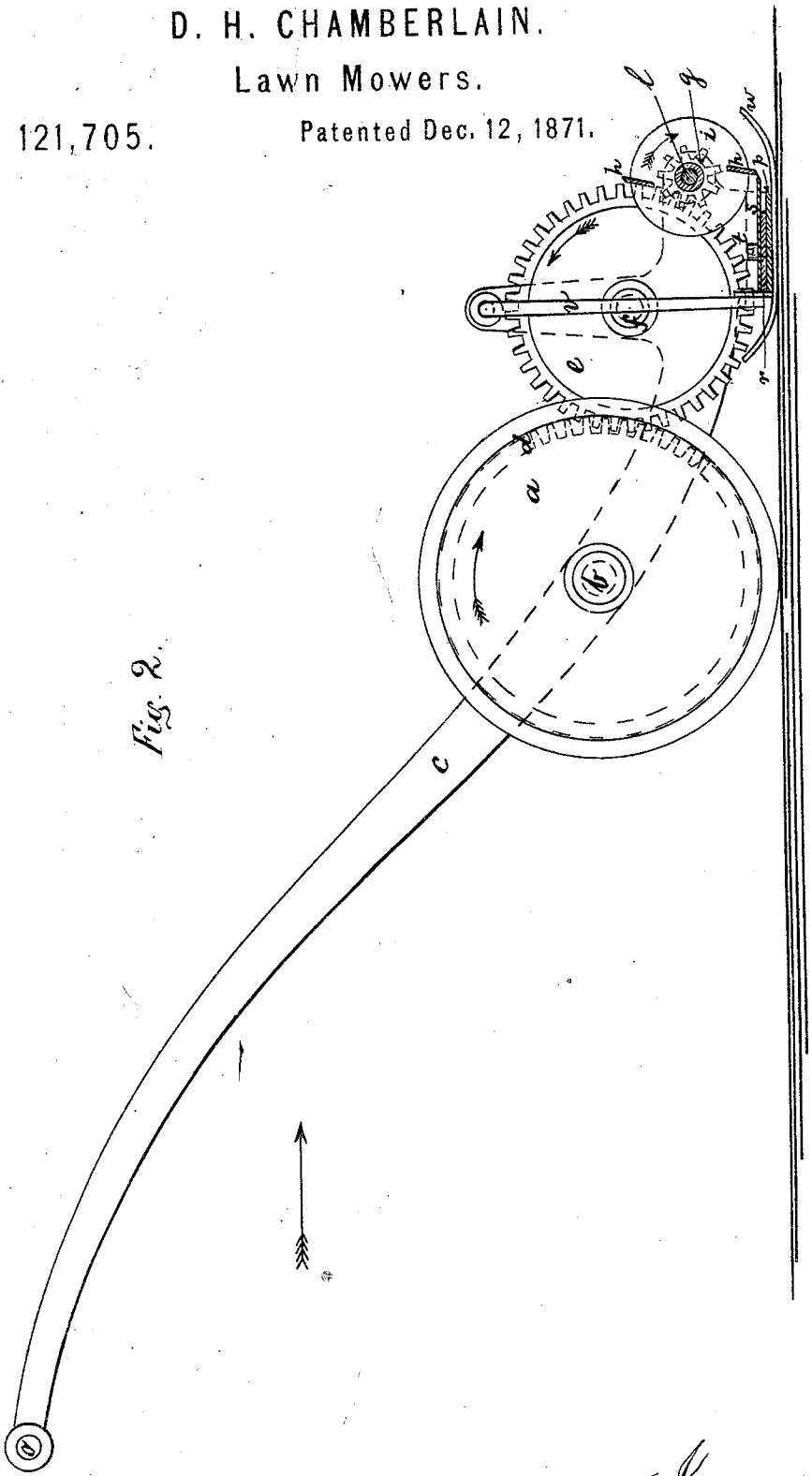

DEXTER H. CHAMBERLAIN, OF WEST ROXBURY, MASSACHUSETTS.

IMPROVEMENT IN LAWN-MOWERS.

Specification forming part of Letters Patent No. 121,705, dated December 12, 1871.

*To all whom it may concern:*

Be it known that I, DEXTER H. CHAMBERLAIN, of West Roxbury, in the county of Norfolk and State of Massachusetts, have invented certain new and useful Improvements on Lawn-Mowers, of which the following is a specification:

The nature of my invention relates to improvements on lawn-mowers with rotating knives, consisting in the arrangement of only one side and bearing in one end of the rotating cutter for the purpose of mowing close up to any objects, such as walls, trees, inclines, delicate plants, &c., and on steep declivities; also, in combination therewith, the employment of a fixed or dead spindle for the rotating cutter to revolve around, as will now be fully shown and described.

On the drawing, Figure 1 is a ground plan. Fig. 2 is a longitudinal section over the line X Y taken on Fig. 1. Fig. 3 is a central longitudinal section over the line A B, taken also on Fig. 1.

Similar letters refer to similar parts wherever they occur on the different parts of the drawing.

The objections made to lawn-mowers as now constructed are, that they are not available for mowing on steep declivities, owing to their great weight and the trouble of holding them in position. Formerly the rotating knives had a bearing in each end of the spindle on which they rotated that made it impossible to mow close up to any projecting objects, such as a wall, fence, rock, tree, &c.; whereas my mower is so light that it can be run along a steep incline and be retained by the pressure of the hand upon the handle, by the action of which enough traction is effected for operating the revolving cutter-blades with a light roller. The bearing for the revolving knives being on one side only, allows the machine to cut plump to a wall, tree, &c., without the need of any extra hand-labor, as formerly required.

To effect this purpose and remove the objections above named, I construct my lawn-mower as follows: $a$ is a roller of suitable size, movable around a spindle, $b$, held stationary in the frame $c$, as shown. A gear, $d$, is attached to the roller $a$, part of which is shown in dotted lines on Fig. 2. The gear $d$ communicates motion to an intermediate gear, $e$, revolving around the fixed spindle $f$, attached to the frame $c$, as shown. The gear $e$ finally communicates the speed from the roller $a$, by means of the small pinion $g$, to the rotating knives $h$ $h$, in a direction as indicated on the arrows on Fig. 2. The knives $h$ $h$ are attached to the disks $i$ $i$ $i'$ in a suitable manner. The number of the knives $h$ $h$ may be two or more, or less, as I may choose to use. The disks $i$ $i$ $i'$ are firmly attached to the hollow spindle $k$, as shown. The small pinion $g$ is secured either to the hollow spindle $k$ or to the side of the disk $i'$, by which arrangement the pinion $g$ is made to form a part of the hollow spindle $k$ and disks $i$ $i$ $i'$. The spindle $k$, disks $i$ $i$ $i'$, knives $h$ $h$, and pinion $g$ rotate together on the stationary or dead spindle $l$ attached to the frame $c$, as shown. The dead spindle $l$ is shown as being attached to the frame $c$ by means of the nut $m$, but it may to equal advantage be riveted, keyed, or otherwise attached, as I may deem proper to secure the same object. A small screw and washer, $n$, prevents the hollow spindle $k$ from sliding off the dead spindle $l$ when the machine is in motion. From the above it will be seen that I am able to cut with the ends of the rotating knives $h$ $h$, marked Z, close to any objects on the lawn or garden, &c., or close to and on any inclines that may exist on any lawn, garden, cemetery, &c., without leaving any strip of grass to be cut by hand. The frame $c$ is made strong enough and of a proper shape to form a rigid support in one end only for the dead spindle $l$ and other parts of the machine. The upper end of the frame $c$ is provided with a suitable handle, $o$, as shown, whereby the machine can be operated. I have shown the machine in the drawing as being right-handed, but a left-handed machine can be built to equal advantage on the same principle when necessary. A sole-plate, $p$, is attached to a flange, $q$, being part of the frame $c$, as shown. On the upper side of the sole $p$ is a strip of India rubber or suitable yielding material, $r$, that constitutes an elastic bed for the stationary knife $s$, by which arrangement the knife $s$ is made to yield a little and thus insure a steady and even cut, that could not be effected with a rigid knife. The knife $s$ is secured to the sole-plate $p$ by means of screws, bolts, or nuts $t$ $t$, as shown. Slot-holes $u$ $u$ may be made in the knife $s$, whereby the knife $s$ can be adjusted properly as it wears off by grinding and sharpening. A stay or brace, $v$, is attached from the frame $c$ to the extreme outer end of the sole-plate $p$, whereby strength and rigidity are obtained. $w$ $w$ are shoes attached to the sole-plates $p$, as shown.

The principal object of this, my invention, is to have the machine so light as to be held and operated on any declivity; and to be able to cut close up to walls, trees, rocks, fences, &c.; and to obtain traction for the operation of the machine by pressure from the hand on the handle, as before named.

Having thus described the nature, construction, and operation of my invention, I wish to secure by Letters Patent, and claim—

1. The arrangement of the rotating knives and their connections, movable around a spindle that has only one support in a frame, $c$, at one end of said rotating knives, as fully set forth and described.

2. The arrangement of the rotary cutters $h\ h$ attached to the disks $i\ i\ i'$ and hollow spindle $k$, rotating around the dead spindle $l$, in combination with only one frame, $c$, on one side of the cutters, as and for the purpose as herein set forth and described.

DEXTER H. CHAMBERLAIN.

Witnesses:
ALBAN ANDRÉN,
J. HENRY SYMONDS.